United States Patent
Bi et al.

(10) Patent No.: US 10,340,998 B2
(45) Date of Patent: Jul. 2, 2019

(54) CHANNEL STATE INFORMATION OBTAINING METHOD AND DEVICE

(71) Applicant: Huawei Technologies Co., Ltd., Shenzhen, Guangdong (CN)

(72) Inventors: Xiaoyan Bi, Shanghai (CN); Dageng Chen, Shanghai (CN); Jian Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/274,170

(22) Filed: Sep. 23, 2016

(65) Prior Publication Data
US 2017/0012690 A1    Jan. 12, 2017

Related U.S. Application Data

(63) Continuation of application No. PCT/CN2014/074043, filed on Mar. 25, 2014.

(51) Int. Cl.
    *H04B 7/06*    (2006.01)
    *H04L 5/14*    (2006.01)
    *H04W 72/04*   (2009.01)

(52) U.S. Cl.
    CPC ............ *H04B 7/0626* (2013.01); *H04L 5/14* (2013.01); *H04W 72/0446* (2013.01); *H04W 72/0453* (2013.01)

(58) Field of Classification Search
    CPC ............ H04B 7/0626; H04W 72/0446; H04W 72/0453; H04L 5/14
    (Continued)

(56) References Cited

U.S. PATENT DOCUMENTS

2002/0172163 A1* 11/2002 Chen .................... H04B 7/2621
                                                          370/281
2006/0148411 A1    7/2006 Cho et al.
(Continued)

FOREIGN PATENT DOCUMENTS

CN    1960209 A    5/2007
CN    101610097 A    12/2009
(Continued)

OTHER PUBLICATIONS

"3rd Generation Partnership Project; Technical Specification Group Radio Access Newtork; Evolved Universal Terrestrial Radio Access (E-UTRA); Physical Layer Procedures (Release 10)"; 3GPP TS 36.213 V10.4.0; Dec. 2011; 125 pages.
(Continued)

*Primary Examiner* — Faisal Choudhury

(57) ABSTRACT

Embodiments of the present invention provide a channel state information obtaining method and a device, where the method includes: determining, by a base station according to radio resource usage, a special timeslot in a frequency range used for downlink data transmission; sending special-timeslot configuration information to user equipment, where the special-timeslot configuration information is used to configure the user equipment to send the uplink physical signal over a downlink frequency band in the special timeslot; and performing channel estimation according to the uplink physical signal after receiving the uplink physical signal sent by the user equipment, to obtain channel state information. Compared with a technical solution in the prior art in which user equipment obtains channel state information and then feeds back the channel state information to a base station, system overheads caused in obtaining, by the base station, the channel state information are reduced.

10 Claims, 3 Drawing Sheets

(58) Field of Classification Search
USPC .......................................................... 370/281
See application file for complete search history.

(56) References Cited

U.S. PATENT DOCUMENTS

| | | | | |
|---|---|---|---|---|
| 2009/0168718 | A1* | 7/2009 | Wang | H04L 1/0026 |
| | | | | 370/330 |
| 2010/0222008 | A1* | 9/2010 | Astely | H04B 7/061 |
| | | | | 455/67.11 |
| 2011/0105167 | A1* | 5/2011 | Pan | H04B 7/0671 |
| | | | | 455/507 |
| 2012/0002662 | A1* | 1/2012 | Wan | H04W 72/082 |
| | | | | 370/345 |
| 2012/0051408 | A1 | 3/2012 | Van Zelst et al. | |
| 2012/0135773 | A1 | 5/2012 | Shen et al. | |
| 2012/0213058 | A1* | 8/2012 | Duan | H04W 74/0841 |
| | | | | 370/221 |
| 2013/0094460 | A1 | 4/2013 | Park et al. | |
| 2013/0114559 | A1 | 5/2013 | Fujimoto | |
| 2013/0170476 | A1* | 7/2013 | Baker | H04W 72/0406 |
| | | | | 370/336 |
| 2013/0182594 | A1 | 7/2013 | Kim et al. | |
| 2013/0344881 | A1 | 12/2013 | Nakasato | |
| 2014/0198747 | A1* | 7/2014 | Ouchi | H04L 5/0053 |
| | | | | 370/329 |
| 2015/0085715 | A1 | 3/2015 | Sun et al. | |
| 2015/0195216 | A1* | 7/2015 | Di Pietro | H04L 41/5025 |
| | | | | 370/252 |
| 2015/0249938 | A1* | 9/2015 | Dudda | H04W 36/0055 |
| | | | | 370/331 |
| 2015/0334755 | A1* | 11/2015 | Ayadurai | H04W 76/14 |
| | | | | 370/252 |
| 2016/0219579 | A1 | 7/2016 | Yamazaki et al. | |

FOREIGN PATENT DOCUMENTS

| | | |
|---|---|---|
| CN | 101834626 A | 9/2010 |
| CN | 101873698 A | 10/2010 |
| CN | 102026280 A | 4/2011 |
| CN | 102468924 A | 5/2012 |
| CN | 103327628 A | 9/2013 |
| EP | 1764967 A2 | 3/2007 |
| JP | 2012109644 A | 6/2012 |
| JP | 2012182660 A | 9/2012 |
| JP | 2013048380 A | 3/2013 |
| JP | 2015070281 A | 4/2015 |
| RU | 2007125310 A | 1/2009 |
| RU | 2364046 A | 8/2009 |

OTHER PUBLICATIONS

"3rd Generation Partnership Project; Technical Specification Group Radio Access Network; Evolved Universal Terrestrial Radio Access (E-UTRA); Multiplexing and Channel Coding (Release 10)"; 3GPP TS 36.212 V10.4.0; Dec. 2011; 79 pages.

"3rd Generation Partnership Project; Technical Specification Group Radio Access Newtork; Evolved Universal Terrestrial Radio Access (E-UTRA); Physical Channels and Modulation (Release 10)"; 3GPP TS 36.211 V10.4.0; Dec. 2012; 93 pages.

* cited by examiner

CHANNEL STATE INFORMATION OBTAINING METHOD AND DEVICE

CROSS-REFERENCE TO RELATED APPLICATIONS

This application is a continuation of International Application No. PCT/CN2014/074043, filed on Mar. 25, 2014, the disclosure of which is hereby incorporated by reference in its entirety.

TECHNICAL FIELD

Embodiments of the present invention relate to communications technologies, and in particular, to a channel state information obtaining method and a device.

BACKGROUND

With wide popularization of mobile terminals, spectrum resources required by a wireless communications network have become increasingly strained, and how to improve spectrum utilization efficiency becomes particularly important. Improving system spectrum utilization by increasing a quantity of antennas of a base station in a large-scale multi-input multi-output system, which has been proposed recently, has received extensive attention. In this wireless transmission solution, the base station needs to obtain downlink channel state information to process channel fading and interference between users, so as to complete operations such as precoding, multi-user scheduling, and multi-user pairing, so that the system obtains a higher throughput rate.

In a frequency division duplex system, frequency bands occupied by uplink and downlink channels are different, and generally, frequency responses of the uplink and downlink channels are independent from each other. Therefore, in the frequency division duplex system, a pilot signal needs to be used at a receive end to perform channel estimation, and then channel state information is fed back to a transmit end by using an uplink channel.

In a technical solution in which a terminal performs channel estimation by measuring channel state information in a downlink time-frequency resource, and feeds back a measurement result to a base station, a system capacity is low, and system overheads increase dramatically as a quantity of antennas increases.

SUMMARY

Embodiments of the present invention provide a channel state information obtaining method and a device, to reduce system overheads caused in obtaining channel state information.

According to a first aspect, an embodiment of the present invention provides a base station, including:

a processing module, configured to determine, according to radio resource usage, a special timeslot in a frequency range used for downlink data transmission, where a downlink frequency resource in the special timeslot is used to transmit an uplink physical signal;

a sending module, configured to send special-timeslot configuration information to user equipment, where the special-timeslot configuration information is used to instruct the user equipment to send the uplink physical signal over a downlink frequency band in the special timeslot; and a receiving module, configured to: receive, over the downlink frequency band in the special timeslot, the uplink physical signal sent by the user equipment, and obtain channel state information according to the uplink physical signal.

In a first possible implementation manner of the first aspect, the special-timeslot configuration information includes frequency resource indication information used in the downlink frequency band in the special timeslot.

With reference to the first aspect or the first possible implementation manner of the first aspect, in a second possible implementation manner, the frequency resource indication information is used to instruct the user equipment to send the uplink physical signal on the downlink frequency resource in the special timeslot; and accordingly, the receiving module is specifically configured to: receive, on the downlink frequency resource in the special timeslot, the uplink physical signal sent by the user equipment, perform channel estimation according to the uplink physical signal, and obtain downlink channel state information.

With reference to the first aspect or the first possible implementation manner of the first aspect, in a third possible implementation manner, the frequency resource indication information is used to instruct the user equipment to send the uplink physical signal on both the downlink frequency resource and an uplink frequency resource in the special timeslot; and accordingly, the receiving module is specifically configured to: receive, on the downlink frequency resource in the special timeslot, the uplink physical signal sent by the user equipment, perform channel estimation according to the uplink physical signal, and obtain downlink channel state information and uplink channel state information.

With reference to the first aspect or the first possible implementation manner of the first aspect, in a fourth possible implementation manner, the frequency resource indication information is used to instruct the user equipment to send the uplink physical signal on a part of downlink frequency resources in the special timeslot; and accordingly, the receiving module is specifically configured to: receive, on the part of downlink frequency resources in the special timeslot, the uplink physical signal sent by the user equipment, perform channel estimation according to the uplink physical signal, and obtain downlink channel state information.

With reference to the first aspect to the fourth possible implementation manner of the first aspect, in a fifth possible implementation manner, the special-timeslot configuration information further includes time period indication information, where the time period indication information is used to indicate a time period occupied when the user equipment sends the uplink physical signal on a frequency resource in the special timeslot and indicate a start time location for sending the uplink physical signal.

With reference to the first aspect to the fourth possible implementation manner of the first aspect, in a sixth possible implementation manner, the special-timeslot configuration information further includes coding sequence indication information, where the coding sequence indication information is used to configure a coding sequence used when the user equipment sends the uplink physical signal.

With reference to the first aspect to the fourth possible implementation manner of the first aspect, in a seventh possible implementation manner, the special-timeslot configuration information further includes first sub-frequency resource indication information, where the first sub-frequency resource indication information is used to indicate a first sub-frequency resource occupied when the user equipment sends the uplink physical signal in the special timeslot, and the first sub-frequency resource is a part of the frequency resources indicated by the frequency resource indication information.

With reference to the fifth possible implementation manner of the first aspect to the seventh possible implementation manner of the first aspect, in an eighth possible implementation manner, the special-timeslot configuration information further includes user cluster indication information and second sub-frequency resource indication information, where the user cluster indication information is used to indicate a user cluster, the user cluster includes multiple user equipments, and the second sub-frequency resource indication information is used to indicate a second sub-frequency resource used when each of the user equipments in the user cluster sends the uplink physical signal in the special timeslot.

According to a second aspect, an embodiment of the present invention provides user equipment, including:

a receiving module, configured to receive special-timeslot configuration information sent by a base station, where the special-timeslot configuration information is used to instruct the user equipment to send an uplink physical signal over a downlink frequency band in a special timeslot, the special timeslot is determined, by the base station according to radio resource usage, in a frequency range used for downlink data transmission, and a downlink frequency resource in the special timeslot is used to transmit the uplink physical signal; and a sending module, configured to send the uplink physical signal to the base station over the downlink frequency band in the special timeslot, so that the base station obtains channel state information according to the uplink physical signal.

In a first possible implementation manner of the second aspect, the special-timeslot configuration information includes frequency resource indication information used in the downlink frequency band in the special timeslot.

With reference to the second aspect or the first possible implementation manner of the second aspect, in a second possible implementation manner, the frequency resource indication information is used to instruct the user equipment to send the uplink physical signal on the downlink frequency resource in the special timeslot; and accordingly, the sending module is specifically configured to send the uplink physical signal to the base station on the downlink frequency resource in the special timeslot.

With reference to the second aspect or the first possible implementation manner of the second aspect, in a third possible implementation manner, the frequency resource indication information is used to instruct the user equipment to send the uplink physical signal on both the downlink frequency resource and an uplink frequency resource in the special timeslot; and accordingly, the sending module is specifically configured to send the uplink physical signal to the base station on both the downlink frequency resource and the uplink frequency resource in the special timeslot.

With reference to the second aspect or the first possible implementation manner of the second aspect, in a fourth possible implementation manner, the frequency resource indication information is used to instruct the user equipment to send the uplink physical signal on a part of downlink frequency resources in the special timeslot; and accordingly, the sending module is specifically configured to send the uplink physical signal to the base station on the part of downlink frequency resources in the special timeslot.

With reference to the second aspect to the fourth possible implementation manner of the second aspect, in a fifth possible implementation manner, the special-timeslot configuration information further includes time period indication information, where the time period indication information is used to indicate a time period occupied when the user equipment sends the uplink physical signal on a frequency resource in the special timeslot and indicate a start time location for sending the uplink physical signal.

With reference to the second aspect to the fourth possible implementation manner of the second aspect, in a sixth possible implementation manner, the special-timeslot configuration information further includes coding sequence indication information, where the coding sequence indication information is used to configure a coding sequence used when the user equipment sends the uplink physical signal.

With reference to the second aspect to the fourth possible implementation manner of the second aspect, in a seventh possible implementation manner, the special-timeslot configuration information further includes first sub-frequency resource indication information, where the first sub-frequency resource indication information is used to indicate a first sub-frequency resource occupied when the user equipment sends the uplink physical signal in the special timeslot, and the first sub-frequency resource is a part of the frequency resources indicated by the frequency resource indication information.

With reference to the fifth possible implementation manner of the second aspect to the seventh possible implementation manner of the second aspect, in an eighth possible implementation manner, the special-timeslot configuration information further includes user cluster indication information and second sub-frequency resource indication information, where the user cluster indication information is used to indicate a user cluster, the user cluster includes multiple user equipments, and the second sub-frequency resource indication information is used to indicate a second sub-frequency resource used when each of the user equipments in the user cluster sends the uplink physical signal in the special timeslot.

According to a third aspect, an embodiment of the present invention provides a channel state information obtaining method, including:

determining, by a base station according to radio resource usage, a special timeslot in a frequency range used for downlink data transmission, where a downlink frequency resource in the special timeslot is used to transmit an uplink physical signal;

sending, by the base station, special-timeslot configuration information to user equipment, where the special-timeslot configuration information is used to instruct the user equipment to send the uplink physical signal over a downlink frequency band in the special timeslot; and receiving, by the base station over the downlink frequency band in the special timeslot, the uplink physical signal sent by the user equipment, and obtaining channel state information according to the uplink physical signal.

In a first possible implementation manner of the third aspect, the special-timeslot configuration information includes frequency resource indication information used in the downlink frequency band in the special timeslot.

With reference to the third aspect or the first possible implementation manner of the third aspect, in a second possible implementation manner, the frequency resource indication information is used to instruct the user equipment to send the uplink physical signal on the downlink frequency resource in the special timeslot; and accordingly, the receiving, by the base station over the downlink frequency band in the special timeslot, the uplink physical signal sent by the user equipment, and obtaining channel state information according to the uplink physical signal includes:

receiving, by the base station on the downlink frequency resource in the special timeslot, the uplink physical signal sent by the user equipment, performing channel estimation according to the uplink physical signal, and obtaining downlink channel state information.

With reference to the third aspect or the first possible implementation manner of the third aspect, in a third possible implementation manner, the frequency resource indication information is used to instruct the user equipment to send the uplink physical signal on both the downlink frequency resource and an uplink frequency resource in the special timeslot; and accordingly, the receiving, by the base station over the downlink frequency band in the special timeslot, the uplink physical signal sent by the user equipment, and obtaining channel state information according to the uplink physical signal includes:

receiving, by the base station on the downlink frequency resource in the special timeslot, the uplink physical signal sent by the user equipment, performing channel estimation according to the uplink physical signal, and obtaining downlink channel state information and uplink channel state information.

With reference to the third aspect or the first possible implementation manner of the third aspect, in a fourth possible implementation manner, the frequency resource indication information is used to instruct the user equipment to send the uplink physical signal on a part of downlink frequency resources in the special timeslot; and accordingly, the receiving, by the base station over the downlink frequency band in the special timeslot, the uplink physical signal sent by the user equipment, and obtaining channel state information according to the uplink physical signal includes:

receiving, by the base station on the part of downlink frequency resources in the special timeslot, the uplink physical signal sent by the user equipment, performing channel estimation according to the uplink physical signal, and obtaining downlink channel state information.

With reference to the third aspect to the fourth possible implementation manner of the third aspect, in a fifth possible implementation manner, the special-timeslot configuration information further includes time period indication information, where the time period indication information is used to indicate a time period occupied when the user equipment sends the uplink physical signal on a frequency resource in the special timeslot and indicate a start time location for sending the uplink physical signal.

With reference to the third aspect to the fourth possible implementation manner of the third aspect, in a sixth possible implementation manner, the special-timeslot configuration information further includes coding sequence indication information, where the coding sequence indication information is used to configure a coding sequence used when the user equipment sends the uplink physical signal.

With reference to the third aspect to the fourth possible implementation manner of the third aspect, in a seventh possible implementation manner, the special-timeslot configuration information further includes first sub-frequency resource indication information, where the first sub-frequency resource indication information is used to indicate a first sub-frequency resource occupied when the user equipment sends the uplink physical signal in the special timeslot, and the first sub-frequency resource is a part of the frequency resources indicated by the frequency resource indication information.

With reference to the fifth possible implementation manner of the third aspect to the seventh possible implementation manner of the third aspect, in an eighth possible implementation manner, the special-timeslot configuration information further includes user cluster indication information and second sub-frequency resource indication information, where the user cluster indication information is used to indicate a user cluster, the user cluster includes multiple user equipments, and the second sub-frequency resource indication information is used to indicate a second sub-frequency resource used when each of the user equipments in the user cluster sends the uplink physical signal in the special timeslot.

According to a fourth aspect, an embodiment of the present invention provides a channel state information obtaining method, including:

receiving, by user equipment, special-timeslot configuration information sent by a base station, where the special-timeslot configuration information is used to instruct the user equipment to send an uplink physical signal over a downlink frequency band in the special timeslot, the special timeslot is determined, by the base station according to radio resource usage, in a frequency range used for downlink data transmission, and a downlink frequency resource in the special timeslot is used to transmit the uplink physical signal; and sending, by the user equipment, the uplink physical signal to the base station over the downlink frequency band in the special timeslot, so that the base station obtains channel state information according to the uplink physical signal.

In a first possible implementation manner of the fourth aspect, the special-timeslot configuration information includes frequency resource indication information used in the downlink frequency band in the special timeslot.

With reference to the fourth aspect or the first possible implementation manner of the fourth aspect, in a second possible implementation manner, the frequency resource indication information is used to instruct the user equipment to send the uplink physical signal on the downlink frequency resource in the special timeslot; and accordingly, the sending, by the user equipment, the uplink physical signal to the base station over the downlink frequency band in the special timeslot includes:

sending, by the user equipment, the uplink physical signal to the base station on the downlink frequency resource in the special timeslot.

With reference to the fourth aspect or the first possible implementation manner of the fourth aspect, in a third possible implementation manner, the frequency resource indication information is used to instruct the user equipment to send the uplink physical signal on both the downlink frequency resource and an uplink frequency resource in the special timeslot; and accordingly, the sending, by the user equipment, the uplink physical signal to the base station over the downlink frequency band in the special timeslot includes:

sending, by the user equipment, the uplink physical signal to the base station on both the downlink frequency resource and the uplink frequency resource in the special timeslot.

With reference to the fourth aspect or the first possible implementation manner of the fourth aspect, in a fourth possible implementation manner, the frequency resource indication information is used to instruct the user equipment to send the uplink physical signal on a part of downlink frequency resources in the special timeslot; and accordingly, the sending, by the user equipment, the uplink physical signal to the base station over the downlink frequency band in the special timeslot includes:

sending, by the user equipment, the uplink physical signal to the base station on the part of downlink frequency resources in the special timeslot.

With reference to the fourth aspect to the fourth possible implementation manner of the fourth aspect, in a fifth possible implementation manner, the special-timeslot configuration information further includes time period indication information, where the time period indication information is used to indicate a time period occupied when the user equipment sends the uplink physical signal on a frequency resource in the special timeslot and indicate a start time location for sending the uplink physical signal.

With reference to the fourth aspect to the fourth possible implementation manner of the fourth aspect, in a sixth possible implementation manner, the special-timeslot configuration information further includes coding sequence indication information, where the coding sequence indication information is used to configure a coding sequence used when the user equipment sends the uplink physical signal.

With reference to the fourth aspect to the fourth possible implementation manner of the fourth aspect, in a seventh possible implementation manner, the special-timeslot configuration information further includes first sub-frequency resource indication information, where the first sub-frequency resource indication information is used to indicate a first sub-frequency resource occupied when the user equipment sends the uplink physical signal in the special timeslot, and the first sub-frequency resource is a part of the frequency resources indicated by the frequency resource indication information.

With reference to the fifth possible implementation manner of the fourth aspect to the seventh possible implementation manner of the fourth aspect, in an eighth possible implementation manner, the special-timeslot configuration information further includes user cluster indication information and second sub-frequency resource indication information, where the user cluster indication information is used to indicate a user cluster, the user cluster includes multiple user equipments, and the second sub-frequency resource indication information is used to indicate a second sub-frequency resource used when each of the user equipments in the user cluster sends the uplink physical signal in the special timeslot.

According to the channel state information obtaining method and the device provided in the embodiments of the present invention, a base station determines, according to radio resource usage, a special timeslot in a frequency range used for downlink data transmission, sends special-timeslot configuration information to user equipment, where the special-timeslot configuration information is used to configure the user equipment to send the uplink physical signal over a downlink frequency band in the special timeslot, and performs channel estimation according to the uplink physical signal after receiving the uplink physical signal sent by the user equipment, to obtain channel state information. Compared with a technical solution in the prior art in which user equipment obtains channel state information and then feeds back the channel state information to a base station, system overheads caused in obtaining, by the base station, the channel state information are reduced.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

In the embodiments of the present invention, in a frequency division duplex (FDD for short) communications system, the following is proposed: A special timeslot is added in the FDD system, and a base station obtains channel state information in the special timeslot. In addition, in the embodiments of the present invention, a hardware resource needs to be adjusted, so that user equipment has a sending channel on a downlink frequency resource in the special timeslot and can send an uplink physical signal, and the base station has a receiving channel on the downlink frequency resource in the special timeslot and can receive the uplink physical signal sent by the user equipment. In addition, alignment of special timeslots is ensured between the user equipment and the base station by using control information, to implement reciprocity calibration between the sending and the receiving on the downlink frequency resource in the special timeslot.

Figure 1:
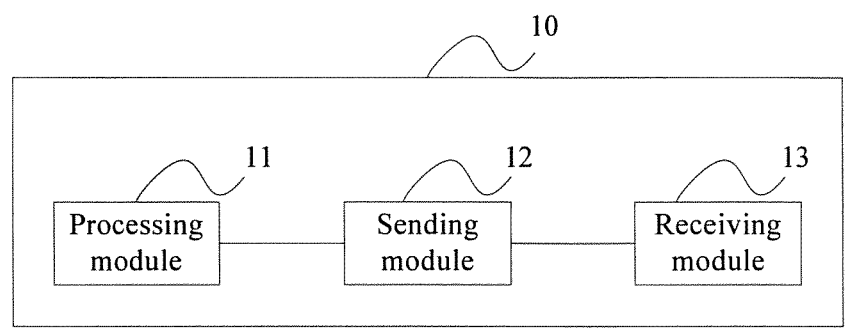
FIG. 1 is a schematic structural diagram of a base station according to Embodiment 1 of the present invention.

FIG. 1 is a schematic structural diagram of a base station according to Embodiment 1 of the present invention. As shown in FIG. 1, the base station 10 provided in this embodiment may include a processing module 11, a sending module 12, and a receiving module 13.

The processing module 11 is configured to determine, according to radio resource usage, a special timeslot in a frequency range used for downlink data transmission, where a downlink frequency resource in the special timeslot is used to transmit an uplink physical signal. The sending module 12 is configured to send special-timeslot configuration information to user equipment, where the special-timeslot configuration information is used to instruct the user equipment to send the uplink physical signal over a downlink frequency band in the special timeslot. The receiving module 13 is configured to: receive, over the downlink frequency band in the special timeslot, the uplink physical signal sent by the user equipment, and obtain channel state information according to the uplink physical signal.

In an actual application, in a wireless system for which a radio resource is determined, the base station 10 may dynamically allocate a frequency resource in a period of time to transmit an uplink physical signal. Specifically, a time-domain location, duration, and a sending period of the special timeslot may all be determined by the base station 10 according to the radio resource usage, for example, according to system resource usage and a requirement on a terminal service. The downlink frequency resource in the special timeslot is only used to transmit the uplink physical signal.

It should be noted that the special-timeslot configuration information may include frequency resource indication information used in the downlink frequency band in the special timeslot.

In a first application scenario, the frequency resource indication information may be used to instruct the user equipment to send the uplink physical signal on the downlink frequency resource in the special timeslot; and accordingly, the receiving module 13 may be specifically configured to: receive, on the downlink frequency resource in the special timeslot, the uplink physical signal sent by the user equipment, perform channel estimation according to the uplink physical signal, and obtain downlink channel state information.

In a second application scenario, the frequency resource indication information may be used to instruct the user equipment to send the uplink physical signal on both the downlink frequency resource and an uplink frequency resource in the special timeslot; and accordingly, the receiving module 13 may be specifically configured to: receive, on the downlink frequency resource in the special timeslot, the uplink physical signal sent by the user equipment, perform channel estimation according to the uplink physical signal, and obtain downlink channel state information and uplink channel state information.

In a third application scenario, the frequency resource indication information may be used to instruct the user equipment to send the uplink physical signal on a part of downlink frequency resources in the special timeslot; and accordingly, the receiving module 13 may be specifically configured to: receive, on the part of downlink frequency resources in the special timeslot, the uplink physical signal sent by the user equipment, perform channel estimation according to the uplink physical signal, and obtain downlink channel state information.

Optionally, in the foregoing three application scenarios, in a multi-user situation, the special-timeslot configuration information may further include time period indication information, where the time period indication information is used to indicate a time period occupied when the user equipment sends the uplink physical signal on a frequency resource in the special timeslot and indicate a start time location for sending the uplink physical signal. That is, uplink physical signals sent by all user equipments may be distinguished by means of Time Division Multiple Access. The uplink physical signals sent by all the user equipments are continuously distributed in a frequency domain in a special timeslot and occupy different time periods.

Optionally, in another feasible implementation manner, the special-timeslot configuration information may further include coding sequence indication information, where the coding sequence indication information is used to configure a coding sequence used when the user equipment sends the uplink physical signal. That is, uplink physical signals sent by all user equipments may be distinguished by means of Code Division Multiple Access. The uplink physical signals sent by all the user equipments are continuously distributed in both time and a frequency domain in a special timeslot, and the uplink physical signals sent by all the user equipments may use different orthogonal codes.

Optionally, in still another feasible implementation manner, the special-timeslot configuration information may further include first sub-frequency resource indication information, where the first sub-frequency resource indication information is used to indicate a first sub-frequency resource occupied when the user equipment sends the uplink physical signal in the special timeslot, and the first sub-frequency resource is a part of the frequency resources indicated by the frequency resource indication information. That is, uplink physical signals sent by all user equipments may be distinguished by means of Frequency Division Multiple Access. The uplink physical signals sent by all the user equipments in a special timeslot are continuously distributed at intervals in a frequency domain, and uplink physical signals sent by different user equipments occupy different frequency resources in a combing structure, so that downlink channel estimation on multiple users can be implemented in a unit time.

Optionally, in still another feasible implementation manner, the special-timeslot configuration information may further include user cluster indication information and second sub-frequency resource indication information, where the user cluster indication information is used to indicate a user cluster, the user cluster includes multiple user equipments, and the second sub-frequency resource indication information is used to indicate a second sub-frequency resource used when each of the user equipments in the user cluster sends the uplink physical signal in the special timeslot. That is, the base station 10 may group user equipments according to a rule to form a user cluster. Each user cluster occupies a frequency sub-band, and each user cluster includes multiple user equipments. When the base station 10 performs channel estimation on a user in each user cluster, the base station 10 only needs to scan a sub-frequency resource occupied by the user cluster. All user equipments in a same user cluster may further send uplink physical signals by means of a Time Division Multiple Access manner, a Frequency Division Multiple Access manner, or a Code Division Multiple Access, and the uplink physical signals are continuously distributed or distributed at intervals in a frequency domain in a special timeslot.

According to the technical solution in this embodiment, a processing module of a base station determines, according to radio resource usage, a special timeslot in a frequency range used for downlink data transmission, a sending module of the base station sends special-timeslot configuration information to user equipment, where the special-timeslot configuration information is used to configure the user equipment to send the uplink physical signal over a downlink frequency band in the special timeslot, and a receiving module performs channel estimation according to the uplink physical signal after receiving the uplink physical signal sent by the user equipment, to obtain channel state information. Compared with a technical solution in the prior art in which user equipment obtains channel state information and then feeds back the channel state information to a base station, system overheads caused in obtaining, by the base station, the channel state information are reduced.

Figure 2:
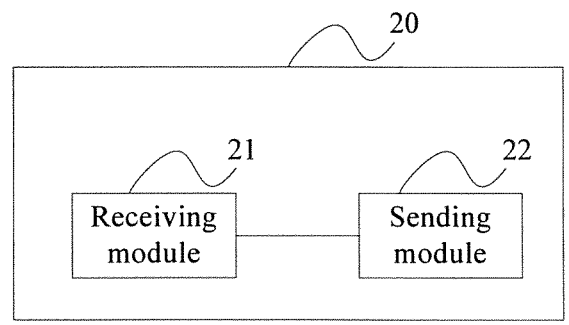
FIG. 2 is a schematic structural diagram of user equipment according to Embodiment 1 of the present invention.

FIG. 2 is a schematic structural diagram of user equipment according to Embodiment 1 of the present invention. As shown in FIG. 2, the user equipment 20 provided in this embodiment may include a receiving module 21 and a sending module 22.

The receiving module 21 is configured to receive special-timeslot configuration information sent by a base station, where the special-timeslot configuration information is used to instruct the user equipment 20 to send an uplink physical signal over a downlink frequency band in the special timeslot, the special timeslot is determined, by the base station according to radio resource usage, in a frequency range used for downlink data transmission, and a downlink frequency resource in the special timeslot is used to transmit the uplink physical signal. The sending module 22 is configured to send the uplink physical signal to the base station over the downlink frequency band in the special timeslot, so that the base station obtains channel state information according to the uplink physical signal.

It should be noted that the special-timeslot configuration information includes frequency resource indication information used in the downlink frequency band in the special timeslot. Optionally, the frequency resource indication information may be used to instruct the user equipment 20 to send the uplink physical signal on the downlink frequency resource in the special timeslot; and accordingly, the sending module 22 may be specifically configured to send the uplink physical signal to the base station on the downlink frequency resource in the special timeslot. Optionally, the frequency resource indication information may be used to instruct the user equipment 20 to send the uplink physical signal on both the downlink frequency resource and an uplink frequency resource in the special timeslot; and accordingly, the sending module 22 may be specifically configured to send the uplink physical signal to the base station on both the downlink frequency resource and the uplink frequency resource in the special timeslot. Optionally, the frequency resource indication information may be used to instruct the user equipment 20 to send the uplink physical signal on a part of downlink frequency resources in the special timeslot; and accordingly, the sending module 22 may be specifically configured to send the uplink physical signal to the base station on the part of downlink frequency resources in the special timeslot.

Further, in a multi-user situation, in a feasible implementation manner, the special-timeslot configuration information may further include time period indication information, where the time period indication information is used to indicate a time period occupied when the user equipment 20 sends the uplink physical signal on a frequency resource in the special timeslot and indicate a start time location for sending the uplink physical signal. That is, uplink physical signals sent by all user equipments 20 may be distinguished by means of Time Division Multiple Access. The uplink physical signals sent by all the user equipments 20 are continuously distributed in a frequency domain in a special timeslot and occupy different time periods.

In another feasible implementation manner, the special-timeslot configuration information may further include coding sequence indication information, where the coding sequence indication information is used to configure a coding sequence used when the user equipment 20 sends the uplink physical signal. That is, uplink physical signals sent by all user equipments 20 may be distinguished by means of Code Division Multiple Access. The uplink physical signals sent by all the user equipments 20 are continuously distributed in both time and a frequency domain in a special timeslot, and the uplink physical signals sent by all the user equipments 20 may use different orthogonal codes.

In still another feasible implementation manner, the special-timeslot configuration information may further include first sub-frequency resource indication information, where the first sub-frequency resource indication information is used to indicate a first sub-frequency resource occupied when the user equipment 20 sends the uplink physical signal in the special timeslot, and the first sub-frequency resource is a part of the frequency resources indicated by the frequency resource indication information. That is, uplink physical signals sent by all user equipments 20 may be distinguished by means of Frequency Division Multiple Access. The uplink physical signals sent by all the user equipments 20 in a special timeslot are continuously distributed at intervals in a frequency domain, and uplink physical signals sent by different user equipments 20 occupy different frequency resources in a combing structure, so that downlink channel estimation on multiple users can be implemented in a unit time.

In still another feasible implementation manner, the special-timeslot configuration information may further include user cluster indication information and second sub-frequency resource indication information, where the user cluster indication information is used to indicate a user cluster, the user cluster includes multiple user equipments 20, and the second sub-frequency resource indication information is used to indicate a second sub-frequency resource used when each of the user equipments 20 in the user cluster sends the uplink physical signal in the special timeslot. That is, the base station may group user equipments 20 according to a rule to form a user cluster. Each user cluster occupies a frequency sub-band, and each user cluster includes multiple user equipments 20. When the base station performs channel estimation on a user in each user cluster, the base station only needs to scan a sub-frequency resource occupied by the user cluster. All user equipments 20 in a same user cluster may further send uplink physical signals in a Time Division Multiple Access manner, a Frequency Division Multiple Access manner, or a Code Division Multiple Access manner, and the uplink physical signals are continuously distributed or distributed at intervals in a frequency domain in a special timeslot.

According to the technical solution in this embodiment, a receiving module of user equipment receives special-timeslot configuration information sent by a base station, where the special-timeslot configuration information is used to configure the user equipment to send an uplink physical signal over a downlink frequency band in the special timeslot, the special timeslot is determined, by the base station according to radio resource usage, in a frequency range used for downlink data transmission, and a downlink frequency resource in the special timeslot is used to transmit the uplink physical signal; and a sending module of the user equipment sends the uplink physical signal to the base station over the downlink frequency band in the special timeslot according to the special-timeslot configuration information, so that the base station performs channel estimation according to the uplink physical signal, and obtains channel state information. Compared with a technical solution in the prior art in which user equipment obtains channel state information and then feeds back the channel state information to a base station, system overheads caused in obtaining, by the base station, the channel state information are reduced.

Figure 3:
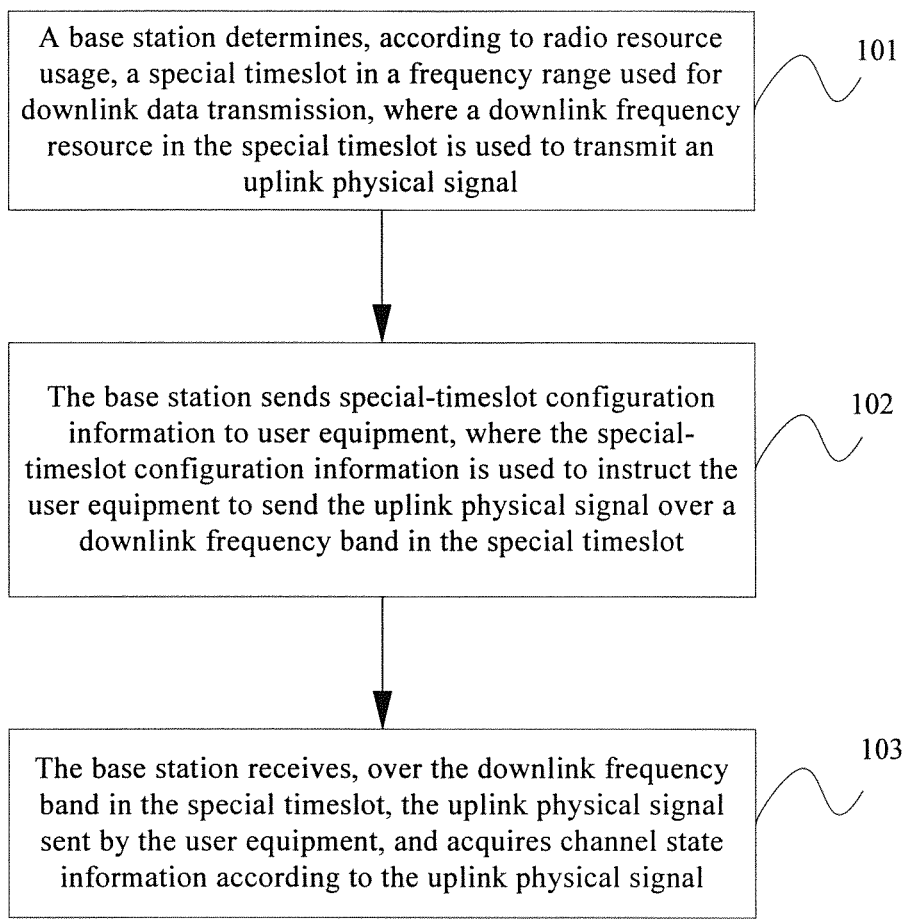
FIG. 3 is a flowchart of a channel state information obtaining method according to Embodiment 1 of the present invention.

FIG. 3 is a flowchart of a channel state information obtaining method according to Embodiment 1 of the present invention. As shown in FIG. 3, the channel state information obtaining method provided in this embodiment may be specifically performed by a base station. The method provided in this embodiment may include:

S101. The base station determines, according to radio resource usage, a special timeslot in a frequency range used for downlink data transmission, where a downlink frequency resource in the special timeslot is used to transmit an uplink physical signal.

In an actual application, in a wireless system for which a radio resource is determined, the base station may dynamically allocate a frequency resource in a period of time to transmit an uplink physical signal. Specifically, a time-domain location, duration, and a sending period of the special timeslot all may be determined by the base station according to the radio resource usage, for example, according to system resource usage and a requirement on a terminal service. The downlink frequency resource in the special timeslot is only used to transmit the uplink physical signal.

S102. The base station sends special-timeslot configuration information to user equipment, where the special-timeslot configuration information is used to instruct the user equipment to send the uplink physical signal over a downlink frequency band in the special timeslot.

It should be noted that the special-timeslot configuration information includes frequency resource indication information used in the downlink frequency band in the special timeslot, where the frequency resource indication information is used to instruct the user equipment to send the uplink physical signal on the downlink frequency resource in the special timeslot, or the frequency resource indication information is used to instruct the user equipment to send the uplink physical signal on both the downlink frequency resource and an uplink frequency resource in the special timeslot, or the frequency resource indication information is used to instruct the user equipment to send the uplink physical signal on a part of downlink frequency resources in the special timeslot, which is not limited in this embodiment.

S103. The base station receives, over the downlink frequency band in the special timeslot, the uplink physical signal sent by the user equipment, and obtains channel state information according to the uplink physical signal.

Optionally, in an actual application, there are the following several application scenarios in this embodiment:

First application scenario: The base station may allocate all downlink frequency resources in the special timeslot to transmit the uplink physical signal, and send the special-timeslot configuration information to the user equipment by using a downlink channel; and the user equipment aligns its special timeslot with a special timeslot of the base station according to the special-timeslot configuration information. In this case, the frequency resource indication information included in the special-timeslot configuration information may be used to instruct the user equipment to send the uplink physical signal on the downlink frequency resource in the special timeslot; the user equipment sends the uplink physical signal on the downlink frequency resource in the special timeslot according to the special-timeslot configuration information; and accordingly, the base station receives, on the downlink frequency resource in the special timeslot, the uplink physical signal sent by the user equipment, performs channel estimation according to the uplink physical signal, and obtains downlink channel state information. Specifically, the user equipment sends the uplink physical signal to the base station, and the base station performs uplink channel estimation according to the received uplink physical signal, and then obtains the downlink channel state information by using reciprocity between uplink and downlink channels.

Second application scenario: The base station may allocate both the downlink frequency resource and an uplink frequency resource in the special timeslot to transmit the uplink physical signal, and send the special-timeslot configuration information to the user equipment by using a downlink channel; and the user equipment aligns its special timeslot with a special timeslot of the base station according to the special-timeslot configuration information. In this case, the frequency resource indication information included in the special-timeslot configuration information is used to instruct the user equipment to send the uplink physical signal on both the downlink frequency resource and the uplink frequency resource in the special timeslot; the user equipment simultaneously sends the uplink physical signal on both the downlink frequency resource and the uplink frequency resource in the special timeslot according to the special-timeslot configuration information; and the base station receives, on the downlink frequency resource in the special timeslot, the uplink physical signal sent by the user equipment, performs channel estimation according to the uplink physical signal, and obtains downlink channel state information and uplink channel state information.

Third application scenario: The base station may allocate a part of downlink frequency resources in the special timeslot to transmit the uplink physical signal, and send the special-timeslot configuration information to the user equipment by using a downlink channel; and the user equipment aligns its special timeslot with a special timeslot of the base station according to the special-timeslot configuration information. In this case, the frequency resource indication information included in the special-timeslot configuration information is used to instruct the user equipment to send the uplink physical signal on the part of downlink frequency resources in the special timeslot; the user equipment sends the uplink physical signal on the part of downlink frequency resources in the special timeslot according to the special-timeslot configuration information; and the base station receives, on the part of downlink frequency resources in the special timeslot, the uplink physical signal sent by the user equipment, performs channel estimation according to the uplink physical signal, and obtains downlink channel state information.

Optionally, in the foregoing three application scenarios, in a multi-user situation, in a feasible implementation manner, the special-timeslot configuration information may further include time period indication information, where the time period indication information is used to indicate a time period occupied when the user equipment sends the uplink physical signal on a frequency resource in the special timeslot and indicate a start time location for sending the uplink physical signal. That is, uplink physical signals sent by all user equipments may be distinguished by means of Time Division Multiple Access. The uplink physical signals sent by all the user equipments are continuously distributed in a frequency domain in a special timeslot and occupy different time periods.

Optionally, in another feasible implementation manner, the special-timeslot configuration information may further include coding sequence indication information, where the coding sequence indication information is used to indicate a coding sequence used when the user equipment sends the uplink physical signal. That is, uplink physical signals sent by all user equipments may be distinguished by means of Code Division Multiple Access. The uplink physical signals sent by all the user equipments are continuously distributed in both time and a frequency domain in a special timeslot, and the uplink physical signals sent by all the user equipments may use different orthogonal codes.

Optionally, in still another feasible implementation manner, the special-timeslot configuration information may further include first sub-frequency resource indication information, where the first sub-frequency resource indication information is used to indicate a first sub-frequency resource occupied when the user equipment sends the uplink physical signal in the special timeslot, and the first sub-frequency resource is a part of the frequency resources indicated by the frequency resource indication information. That is, uplink physical signals sent by all user equipments may be distinguished by means of Frequency Division Multiple Access. The uplink physical signals sent by all the user equipments in a special timeslot are continuously distributed at intervals in a frequency domain, and uplink physical signals sent by different user equipments occupy different frequency resources in a combing structure, so that downlink channel estimation on multiple users can be implemented in a unit time.

Optionally, in still another feasible implementation manner, the special-timeslot configuration information may further include user cluster indication information and second sub-frequency resource indication information, where the user cluster indication information is used to indicate a user cluster, the user cluster includes multiple user equipments, and the second sub-frequency resource indication information is used to indicate a second sub-frequency resource used when each of the user equipments in the user cluster sends the uplink physical signal in the special timeslot. That is, the base station may group user equipments according to a rule to form a user cluster. Each user cluster occupies a frequency sub-band, and each user cluster includes multiple user equipments. When the base station performs channel estimation on a user in each user cluster, the base station only needs to scan a sub-frequency resource occupied by the user cluster. All user equipments in a same user cluster may further send uplink physical signals in a Time Division Multiple Access manner, a Frequency Division Multiple Access manner, or a Code Division Multiple Access manner, and the uplink physical signals are continuously distributed or distributed at intervals in a frequency domain in a special timeslot.

According to the technical solution in this embodiment, a base station determines, according to radio resource usage, a special timeslot in a frequency range used for downlink data transmission, sends special-timeslot configuration information to user equipment, where the special-timeslot configuration information is used to configure the user equipment to send the uplink physical signal over a downlink frequency band in the special timeslot, and performs channel estimation according to the uplink physical signal after receiving the uplink physical signal sent by the user equipment, to obtain channel state information. Compared with a technical solution in the prior art in which user equipment obtains channel state information and then feeds back the channel state information to a base station, system overheads caused in obtaining, by the base station, the channel state information are reduced.

Figure 4:
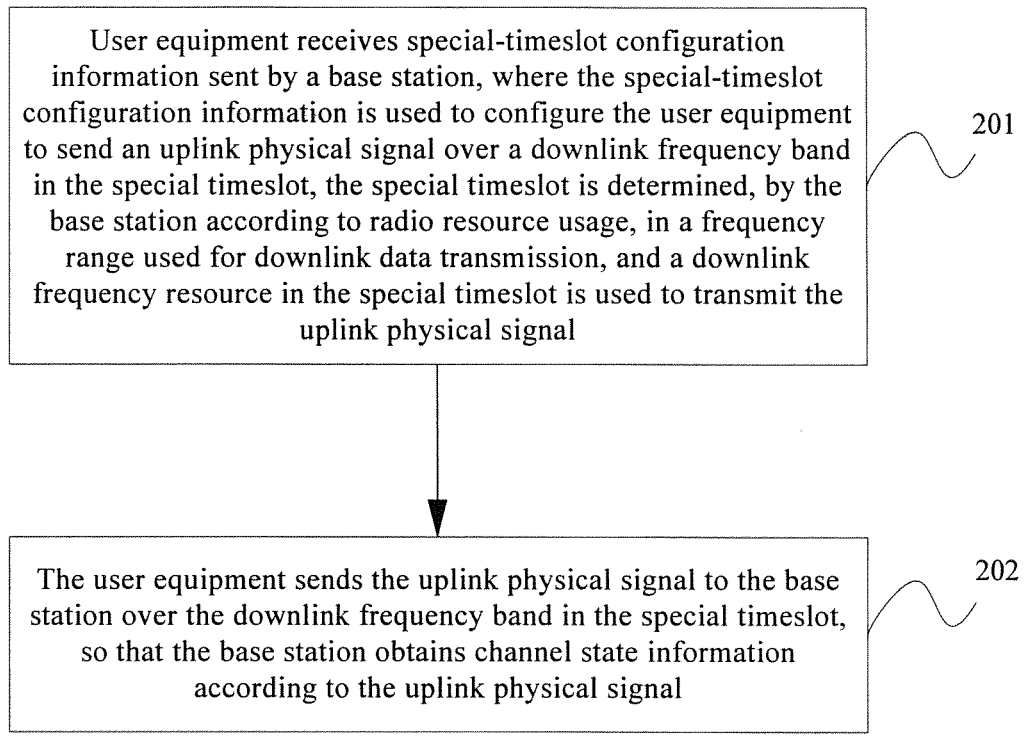
FIG. 4 is a flowchart of a channel state information obtaining method according to Embodiment 2 of the present invention.

FIG. 4 is a flowchart of a channel state information obtaining method according to Embodiment 2 of the present invention. As shown in FIG. 4, the channel state information obtaining method provided in this embodiment may be specifically performed by user equipment. The method provided in this embodiment may include:

S201. The user equipment receives special-timeslot configuration information sent by a base station, where the special-timeslot configuration information is used to configure the user equipment to send an uplink physical signal over a downlink frequency band in the special timeslot, the special timeslot is determined, by the base station according to radio resource usage, in a frequency range used for downlink data transmission, and a downlink frequency resource in the special timeslot is used to transmit the uplink physical signal.

It should be noted that the special-timeslot configuration information includes frequency resource indication information used in the downlink frequency band in the special timeslot, where the frequency resource indication information is used to instruct the user equipment to send the uplink physical signal on the downlink frequency resource in the special timeslot, or the frequency resource indication information is used to instruct the user equipment to send the uplink physical signal on both the downlink frequency resource and an uplink frequency resource in the special timeslot, or the frequency resource indication information is used to instruct the user equipment to send the uplink physical signal on a part of downlink frequency resources in the special timeslot, which is not limited in this embodiment.

S202. The user equipment sends the uplink physical signal to the base station over the downlink frequency band in the special timeslot, so that the base station obtains channel state information according to the uplink physical signal.

In an actual application, optionally, when the frequency resource indication information is used to instruct the user equipment to send the uplink physical signal on the downlink frequency resource in the special timeslot, the user equipment sends the uplink physical signal to the base station on the downlink frequency resource in the special timeslot, so that the base station receives, on the downlink frequency resource in the special timeslot, the uplink physical signal sent by the user equipment, performs channel estimation according to the uplink physical signal, and obtains downlink channel state information. Specifically, the base station may perform uplink channel estimation according to the received uplink physical signal sent by the user equipment, and then obtain the downlink channel state information by using reciprocity between uplink and downlink channels.

Optionally, when the frequency resource indication information is used to instruct the user equipment to send the uplink physical signal on both the downlink frequency resource and an uplink frequency resource in the special timeslot, the user equipment sends the uplink physical signal to the base station on both the downlink frequency resource and the uplink frequency resource in the special timeslot, so that the base station receives, on the downlink frequency resource in the special timeslot, the uplink physical signal sent by the user equipment, performs channel estimation according to the uplink physical signal, and obtains downlink channel state information and uplink channel state information.

Optionally, when the frequency resource indication information is used to instruct the user equipment to send the uplink physical signal on a part of downlink frequency resources in the special timeslot, the user equipment sends the uplink physical signal to the base station on the part of downlink frequency resources in the special timeslot, so that the base station receives, on the part of downlink frequency resources in the special timeslot, the uplink physical signal sent by the user equipment, performs channel estimation according to the uplink physical signal, and obtains downlink channel state information.

Further, in a multi-user situation, in a feasible implementation manner, the special-timeslot configuration information may further include time period indication information, where the time period indication information is used to indicate a time period occupied when the user equipment sends the uplink physical signal on a frequency resource in the special timeslot and indicate a start time location for sending the uplink physical signal. That is, uplink physical signals sent by all user equipments may be distinguished by means of Time Division Multiple Access. The uplink physical signals sent by all the user equipments are continuously distributed in a frequency domain in a special timeslot and occupy different time periods.

In another feasible implementation manner, the special-timeslot configuration information may further include coding sequence indication information, where the coding sequence indication information is used to indicate a coding sequence used when the user equipment sends the uplink physical signal. That is, uplink physical signals sent by all user equipments may be distinguished by means of Code Division Multiple Access. The uplink physical signals sent by all the user equipments are continuously distributed in both time and a frequency domain in a special timeslot, and the uplink physical signals sent by all the user equipments may use different orthogonal codes.

In still another feasible implementation manner, the special-timeslot configuration information may further include first sub-frequency resource indication information, where the first sub-frequency resource indication information is used to indicate a first sub-frequency resource occupied when the user equipment sends the uplink physical signal in the special timeslot, and the first sub-frequency resource is a part of the frequency resources indicated by the frequency resource indication information. That is, uplink physical signals sent by all user equipments may be distinguished by means of Frequency Division Multiple Access. The uplink physical signals sent by all the user equipments in a special timeslot are continuously distributed at intervals in a frequency domain, and uplink physical signals sent by different user equipments occupy different frequency resources in a combing structure, so that downlink channel estimation on multiple users can be implemented in a unit time.

In still another feasible implementation manner, the special-timeslot configuration information may further include user cluster indication information and second sub-frequency resource indication information, where the user cluster indication information is used to indicate a user cluster, the user cluster includes multiple user equipments, and the second sub-frequency resource indication information is used to indicate a second sub-frequency resource used when each of the user equipments in the user cluster sends the uplink physical signal in the special timeslot. That is, the base station may group user equipments according to a rule to form a user cluster. Each user cluster occupies a frequency sub-band, and each user cluster includes multiple user equipments. When the base station performs channel estimation on a user in each user cluster, the base station only needs to scan a sub-frequency resource occupied by the user cluster. All user equipments in a same user cluster may further send uplink physical signals in a Time Division Multiple Access manner, a Frequency Division Multiple Access manner, or a Code Division Multiple Access manner, and the uplink physical signals are continuously distributed or distributed at intervals in a frequency domain in a special timeslot.

According to the technical solution in this embodiment, user equipment receives special-timeslot configuration information sent by a base station, where the special-timeslot configuration information is used to configure the user equipment to send an uplink physical signal over a downlink frequency band in the special timeslot, the special timeslot is determined, by the base station according to radio resource usage, in a frequency range used for downlink data transmission, and a downlink frequency resource in the special timeslot is used to transmit the uplink physical signal; and the user equipment sends the uplink physical signal to the base station over the downlink frequency band in the special timeslot according to the special-timeslot configuration information, so that the base station performs channel estimation according to the uplink physical signal, and obtains channel state information. Compared with a technical solution in the prior art in which user equipment obtains channel state information and then feeds back the channel state information to a base station, system overheads caused in obtaining, by the base station, the channel state information are reduced.

In the several embodiments provided in the present invention, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor (processor) to perform a part of the steps of the methods described in the embodiments of the present invention. The foregoing storage medium includes: any medium that can store program code, such as a USE flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A base station in a frequency division duplex (FDD) communication system, comprising:
    a processor, configured to determine, according to radio resource usage, a special timeslot added in the FDD system, wherein, in the special timeslot, a downlink frequency resource in a frequency range configured for downlink data transmission is usable by user equipment to transmit an uplink physical signal;
    a transmitter, configured to send special-timeslot configuration information to user equipment for instructing the user equipment to send, in the special timeslot, the uplink physical signal over a downlink frequency band in the frequency range configured for downlink data transmission;
    a receiver, configured to:
        receive, in the special timeslot, the uplink physical signal sent by the user equipment over the downlink frequency band in the frequency range configured for downlink data transmission,
        perform channel estimation according to the received uplink physical signal, and
        obtain downlink channel state information from the channel estimation; and
    wherein the special-timeslot configuration information comprises user cluster indication information and sub-frequency resource indication information, the user cluster indication information indicates a user cluster, the user cluster comprises multiple user equipments, and the sub-frequency resource indication information indicates a sub-frequency resource for each of the user equipments in the user cluster to send the uplink physical signal in the special timeslot.

2. The base station according to claim 1, wherein the special-timeslot configuration information further comprises frequency resource indication information for use in the downlink frequency band in the special timeslot.

3. The base station according to claim 1, wherein:
    to perform channel estimation according to the received uplink physical signal, the receiver is configured to: perform uplink channel estimation according to the received uplink physical signal; and
    to obtain downlink channel state information from the channel estimation, the receiver is configured to: obtain, after performing uplink channel estimation, the downlink channel state information by using reciprocity between uplink and downlink channels.

4. User equipment in a frequency division duplex (FDD) communication system, comprising:
    a receiver, configured to receive special-timeslot configuration information sent by a base station, wherein the special-timeslot configuration information is for instructing the user equipment to send, in a special timeslot added in the FDD system, an uplink physical signal over a downlink frequency band within a frequency range configured for downlink data transmission;
    a transmitter, configured to send, in the special timeslot, the uplink physical signal to the base station over the downlink frequency band within a frequency range configured for downlink data transmission for enabling the base station to perform channel estimation according to the received uplink physical signal and obtain download channel state information from the channel estimation; and
    wherein the special-timeslot configuration information comprises user cluster indication information and sub-frequency resource indication information, the user cluster indication information indicates a user cluster, the user cluster comprises multiple user equipments, and the sub-frequency resource indication information indicates a sub-frequency resource for each of the user equipments in the user cluster to send the uplink physical signal in the special timeslot.

5. The user equipment according to claim 4, wherein the special-timeslot configuration information further comprises frequency resource indication information for use in the downlink frequency band in the special timeslot.

6. A channel state information obtaining method for a frequency division duplex (FDD) communication system, comprising:
    determining, by a base station according to radio resource usage, a special timeslot added in the FDD system, wherein, in the special timeslot, a downlink frequency resource in a frequency range configured for downlink data transmission is usable by user equipment to transmit an uplink physical signal;
    sending, by the base station, special-timeslot configuration information to user equipment for instructing the user equipment to send, in the special timeslot, the uplink physical signal over a downlink frequency band in the frequency range configured for downlink data transmission;
    receiving, by the base station in the special timeslot, the uplink physical signal sent by the user equipment over the downlink frequency band in the frequency range configured for downlink data transmission;
    performing channel estimation according to the received uplink physical signal;
    obtaining downlink channel state information from the channel estimation; and
    wherein the special-timeslot configuration information comprises user cluster indication information and sub-frequency resource indication information, the user cluster indication information indicates a user cluster, the user cluster comprises multiple user equipments, and the sub-frequency resource indication information indicates a sub-frequency resource for each of the user equipments in the user cluster to send the uplink physical signal in the special timeslot.

7. The method according to claim 6, wherein the special-timeslot configuration information further comprises frequency resource indication information for use in the downlink frequency band in the special timeslot.

8. The method according to claim 6, wherein:
    performing channel estimation according to the received uplink physical signal comprises:
        performing uplink channel estimation according to the received uplink physical signal; and
    obtaining downlink channel state information from the channel estimation comprises:

obtaining, after performing uplink channel estimation, the downlink channel state information by using reciprocity between uplink and downlink channels.

9. A channel state information obtaining method for a frequency division duplex (FDD) communication system, comprising:

receiving, by user equipment, special-timeslot configuration information sent by a base station, wherein the special-timeslot configuration information is for instructing the user equipment to send, in a special timeslot added in the FDD system, an uplink physical signal over a downlink frequency band within a frequency range configured for downlink data transmission;

sending, by the user equipment in the special timeslot, the uplink physical signal to the base station over the downlink frequency band within a frequency range configured for downlink data transmission for enabling the base station to perform channel estimation according to the received uplink physical signal and obtain download channel state information from the channel estimation; and wherein the special-timeslot configuration information comprises user cluster indication information and sub-frequency resource indication information, the user cluster indication information indicates a user cluster, the user cluster comprises multiple user equipments, and the sub-frequency resource indication information indicates a sub-frequency resource for each of the user equipments in the user cluster to send the uplink physical signal in the special timeslot.

10. The method according to claim 9, wherein the special-timeslot configuration information further comprises frequency resource indication information for use in the downlink frequency band in the special timeslot.

* * * * *